United States Patent
Chen et al.

(10) Patent No.: US 9,094,829 B2
(45) Date of Patent: Jul. 28, 2015

(54) EQUIPMENT IDENTITY REGISTRATION

(75) Inventors: Xuming Chen, San Ramon, CA (US); Lily Hui Zhu, Parsippany, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 54 days.

(21) Appl. No.: 13/429,620

(22) Filed: Mar. 26, 2012

(65) Prior Publication Data

US 2013/0254395 A1  Sep. 26, 2013

(51) Int. Cl.
| | |
|---|---|
| *G06F 15/173* | (2006.01) |
| *G06F 15/16* | (2006.01) |
| *H04W 12/08* | (2009.01) |
| *H04W 48/02* | (2009.01) |
| *H04L 29/06* | (2006.01) |
| *H04L 29/12* | (2006.01) |

(52) U.S. Cl.
CPC .............. *H04W 12/08* (2013.01); *H04W 48/02* (2013.01); *G06F 15/173* (2013.01); *H04L 61/1588* (2013.01); *H04L 61/6054* (2013.01); *H04L 63/0876* (2013.01)

(58) Field of Classification Search
CPC ........................ H04L 61/6054; H04L 29/12905; H04L 2209/80; H04W 12/06; H04W 4/021; H04W 8/205
See application file for complete search history.

(56) References Cited

U.S. PATENT DOCUMENTS

| | | | | |
|---|---|---|---|---|
| 6,006,091 | A * | 12/1999 | Lupien | 455/435.1 |
| 2001/0027117 | A1* | 10/2001 | Alanara | 455/551 |
| 2004/0024867 | A1* | 2/2004 | Kjellberg | 709/224 |
| 2006/0034456 | A1* | 2/2006 | McGough | 380/30 |
| 2010/0248771 | A1* | 9/2010 | Brewer et al. | 455/518 |
| 2011/0287740 | A1* | 11/2011 | Vos et al. | 455/410 |
| 2012/0039312 | A1* | 2/2012 | Narkar et al. | 370/338 |
| 2013/0104113 | A1* | 4/2013 | Gupta et al. | 717/169 |
| 2013/0232555 | A1* | 9/2013 | Zhang et al. | 726/4 |
| 2014/0099928 | A1* | 4/2014 | Caldwell et al. | 455/411 |

FOREIGN PATENT DOCUMENTS

| WO | WO 2011140159 A2 * | 11/2011 |
|---|---|---|
| WO | WO 2012168761 A1 * | 12/2012 |

* cited by examiner

*Primary Examiner* — Joshua Joo
*Assistant Examiner* — Younes Naji (57) ABSTRACT

Method, device, and storage medium for receiving a request to attach to a network from a device; obtaining a user identifier and a device identifier; identifying an enhanced type allocation code identifier based on the device identifier; storing enhanced type allocation code identifiers; determining if network access is granted or denied based on whether a correlation exists between the user identifier and the enhanced type allocation code identifier; and granting network access in response to a determination that the correlation exists between the user identifier and the enhanced type allocation code identifier.

20 Claims, 10 Drawing Sheets

EQUIPMENT IDENTITY REGISTRATION

BACKGROUND

Access to a network can include authentication and/or authorization procedures. According to some frameworks, black lists, grey lists, and white lists are used to grant or deny access to the network.

DETAILED DESCRIPTION

The following detailed description refers to the accompanying drawings. The same reference numbers in different drawings may identify the same or similar elements.

According to an exemplary embodiment, a network includes network devices (or network elements) and a subscriber data management system that cooperatively operate to regulate access to the network. According to an exemplary embodiment, the subscriber data management system includes an enhanced type allocation code (TAC) database and an enhanced identity policing database. According to an exemplary embodiment, an enhanced equipment identity registration device includes the enhanced type allocation code database and the enhanced identity policing database.

According to an exemplary embodiment, the enhanced type allocation code database stores, among other information, an enhanced type allocation code identifier. According to an exemplary implementation, the enhanced type allocation code identifier includes digits of an equipment identifier (e.g., digits of an International Mobile Equipment Identifier (IMEI)). For example, the enhanced type allocation code identifier may include the first 8-10 digits of the IMEI. Alternatively, the enhanced type allocation code identifier may include more than 10 digits (e.g., 14 digits or some other number of digits).

According to an exemplary embodiment, the enhanced type allocation code identifier correlates to other information pertaining to network access and/or network usage by a user. According to an exemplary implementation, the other information pertains to user device capability information. For example, the user device capability information may include information pertaining to the wireless bands in which the user device operates, information pertaining to the display capabilities of the user device (e.g., screen resolution, size, etc.), as well as other information, as described further below. Additionally, according to an exemplary implementation, the other information pertains to a user device class. The user device class indicates a class, a type, or a category of a user device. For example, the user device class may correlate with or indicate a type of service (e.g., a network service) a user device may use or access via the network.

According to an exemplary embodiment, the enhanced type allocation code identifier and information correlated therewith are used in determining network access. Additionally, according to an exemplary embodiment, the enhanced type allocation code identifier and information correlated therewith are used in providing a particular service or asset to a user. For example, application servers in a network may obtain user device capability information and/or user device class information and use this information to provide a service, a function, etc.

According to an exemplary embodiment, the identity policing database stores user identity information. For example, the user identity information may be implemented as an International Mobile Subscriber Identity (IMSI). According to an exemplary embodiment, information stored in the identity policing database correlates with information stored in the enhanced equipment identity registration database, as described herein.

According to an exemplary embodiment, an authentication, authorization, and accounting device or element is communicatively coupled to the enhanced equipment identity registration device in which the information stored in the enhanced equipment identity registration database is used for network access policing. According to an exemplary embodiment, a subscriber data management device is communicatively coupled to the enhanced equipment identity registration device in which the information stored in the enhanced equipment identity registration database is used for network access policing. For example, the subscriber data management device may be implemented as a home subscriber server.

While exemplary embodiments provided in this description may be implemented based on the use of a particular protocol, network architecture, platform, user identifier, device identifier, etc., such implementations are not intended to be restrictive or provide an exhaustive treatment, as such. In other words, the embodiments described herein may be implemented using other suitable protocols, network architectures, platforms, user identifiers, device identifiers, etc., which may not be specifically described.

Figure 1A:
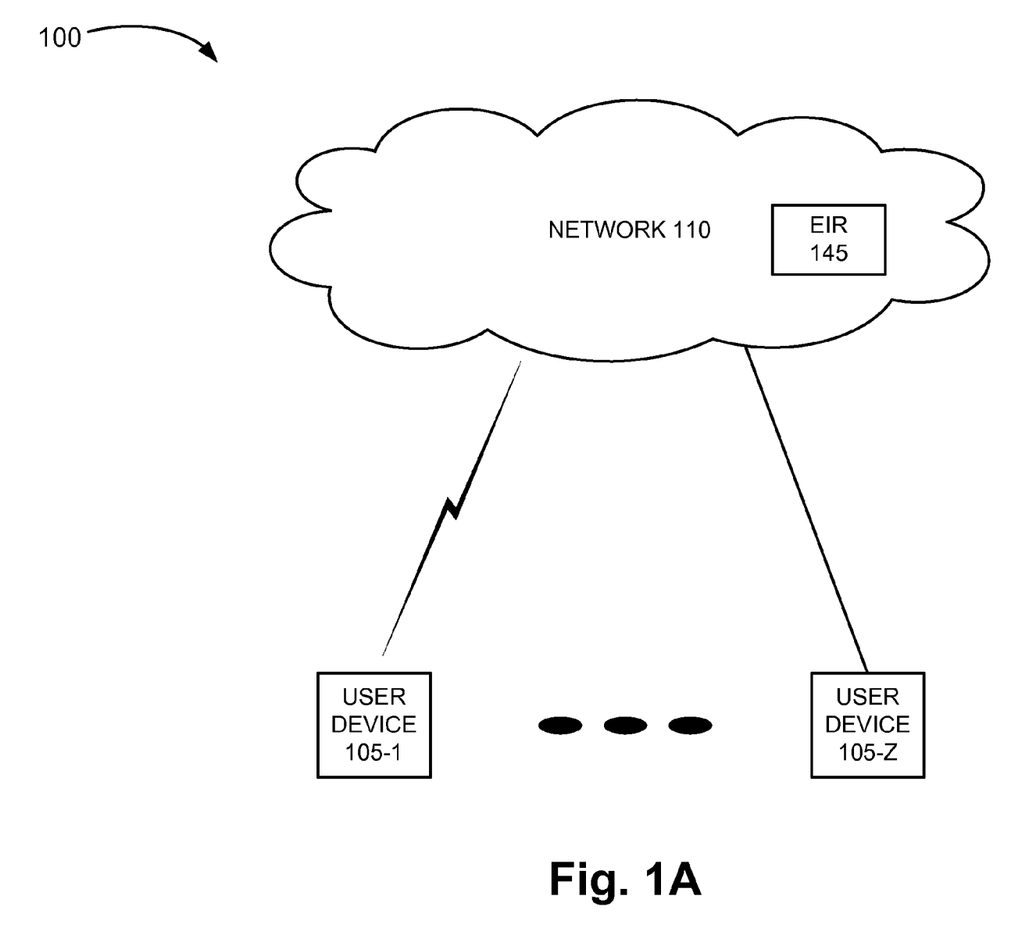
FIG. 1A is a diagram illustrating an exemplary environment in which an exemplary embodiment of an enhanced equipment identity registration device may be implemented.

FIG. 1A is a diagram illustrating an exemplary environment in which an exemplary embodiment of an enhanced equipment identity registration device may be implemented. As illustrated in FIG. 1A, environment 100 includes user devices 105-1 through 105-X, in which X>1 (also referred to generally as user device 105 or user devices 105) and a network 110. Network 110 includes an equipment identity registration 145.

User device 105 includes a device having the capability to communicate with other devices, networks, systems, and the like. For example, user device 105 may be implemented as a smartphone, a wireless telephone, an IP telephone, a Web access device, a personal digital assistant (PDA), a gaming device, a personal communication system (PCS) terminal, a pervasive computing device, a video playing device, a computer, a music playing device, and/or some other type of device (e.g., a portable device, a mobile device, a handheld device, a stationary device, a vehicle-based device, etc.). User device 105 may operate according to one or more other wireless and/or wired network standards.

Network 110 includes one or multiple networks. Network 110 may include a wireless network (e.g., mobile network, cellular network, non-cellular network, an ad hoc network, etc.). By way of example, network 110 may be implemented as a Long Term Evolution (LTE) network, an evolved High Rate Packet Data (eHRPD) network, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, a Evolution Data Optimized (EV-DO) network, a Code Division Multiple Access (CDMA)-based network, or some combination thereof. Network 110 may include a wired network. By way of example, network 110 may be implemented as an optical network, a coaxial network, or a combination thereof.

Equipment identity registration 145 includes a network device that maintains type allocation code information and equipment identity registration information. Equipment identify registration 145 is described further below.

Figure 1B:
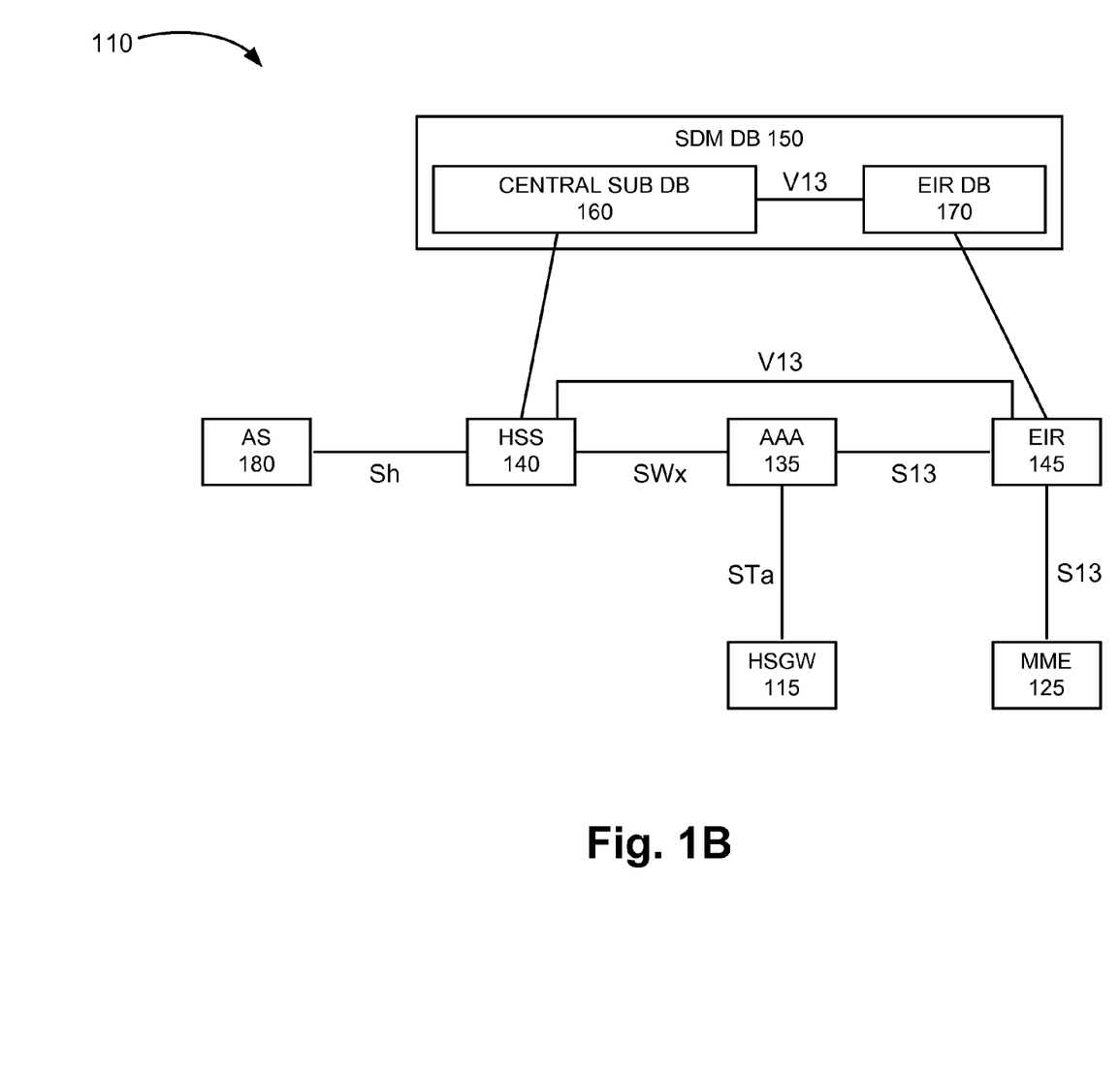
FIG. 1B is a diagram illustrating an exemplary configuration of an equipment identity registration device in relation to other network devices included in the network depicted in FIG. 1A.

FIG. 1B is a diagram illustrating an exemplary configuration of EIR 145 in relation to other devices included in network 110. According to this exemplary embodiment, network 110 includes an HRPD serving gateway (HSGW) 115, a mobility management entity (MME) 125, a authentication, authorization, and accounting (AAA) 135, a home subscriber server (HSS) 140, a subscriber data management database (SDM DB) 150 that includes a central subscriber database 160 and an EIR DB 170. Network 110 also includes an application server 180.

As further illustrated, both MME 125 and AAA 135 are communicatively coupled to EIR 145 via an S13 interface, and HSS 140 and EIR 145 are communicatively coupled via a V13 interface. Also, central subscriber database 160 and an EIR database 170 are communicatively coupled via the V13 interface. Additionally, HSGW 115 and AAA 135 are communicatively coupled via an STa interface, HSS 140 and AAA 135 are communicatively coupled via an SWx interface, and AS 180 and HSS 140 are communicatively coupled via an Sh interface. According to other implementations, the connections and/or interfaces described and illustrated in FIG. 1B may be different depending on, for example, the specific network elements used. The V13 interface is implemented as a new Diameter-based interface to provide communication between central subscriber database 160 and EIR database 170, as described further below.

The type of devices included in network 110 having EIR 145, as illustrated in FIG. 1B, is exemplary. According to other implementations, network 110 may include additional devices, fewer devices, different devices, and/or differently arranged devices than those illustrated in FIG. 1B. For example, depending on the communication standard implemented, network 110 will include suitable network elements or network devices that support the communication standard. As previously described, network 110 may be implemented according to various communication standards, such as, LTE, GSM, EV-DO, etc. Additionally, a network device illustrated in FIG. 1B may be implemented by another network device that is known to perform similar functions. By way of example, HSS 140 may be implemented as a Home Location Register (HLR) or a User Profile Server Function (UPSF). Additionally, or alternatively, AAA 135 may be implemented as an Authentication Center (AuC).

Also, according to other implementations, one or more functions and/or processes described as being performed by a particular network device may be performed by a different device, or some combination of devices, which may or may not include the particular device.

Figure 1C:
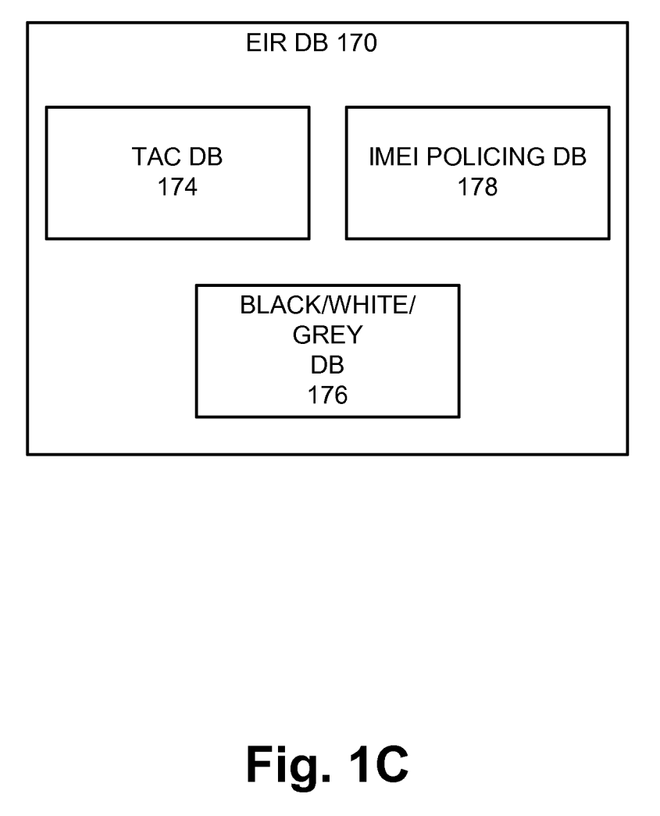
FIG. 1C is a diagram illustrating an exemplary enhanced equipment identity registration database.

FIG. 1C is a diagram illustrating an exemplary embodiment of EIR database 170. As illustrated, EIR database 170 includes a type allocation code database (TAC DB) 174, a black, white, and grey list database 176, and an International Mobile Equipment Identity policing database (IMEI policing DB) 178.

TAC database 174 includes a database that stores make and model information pertaining to user devices. TAC database 174 also stores information pertaining to classes of user devices and information pertaining to user device capabilities.

Figure 2A:
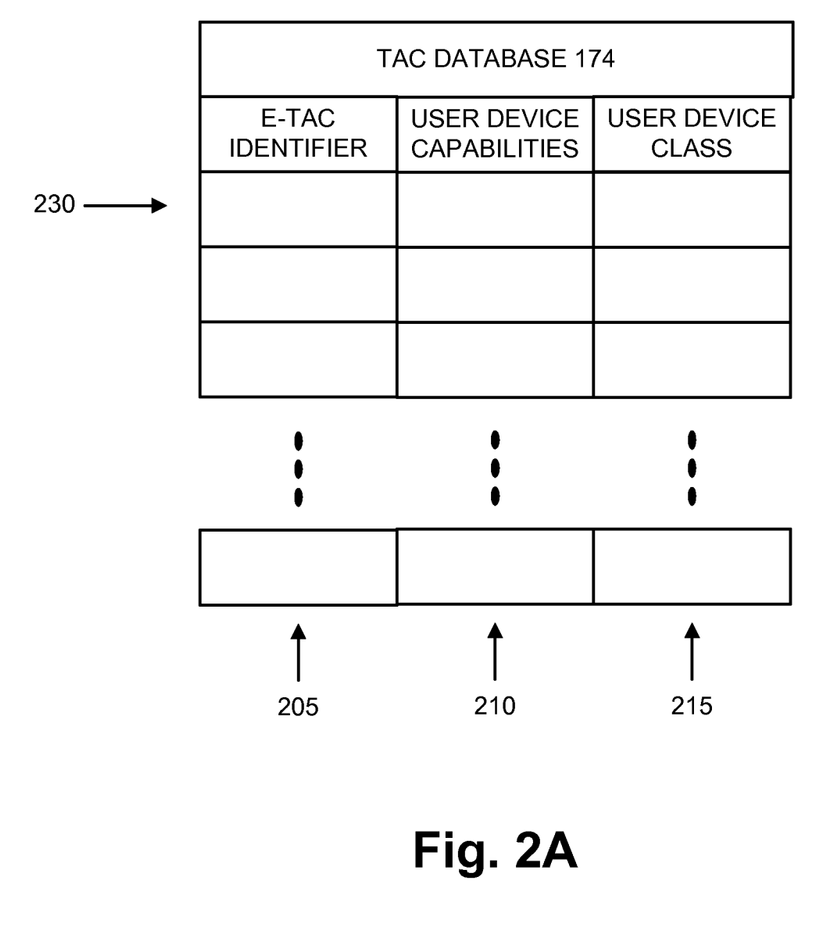
FIG. 2A is a diagram illustrating an exemplary enhanced-type code allocation identifier database.

FIG. 2A is a diagram illustrating an exemplary implementation of TAC database 174. As illustrated, TAC database 174 includes an e-TAC identifier field 205, a user device capabilities field 210, and a user device class field 215. An entry 230 represents a row-wise correlation between e-TAC identifier field 205 and other fields of TAC database 174. For example, an e-TAC identifier may be used as an index or a lookup key to TAC database 174. According to other implementations, TAC database 174 may include additional fields, fewer fields, and/or different fields. For example, user device capabilities field 210 may be expanded to multiple fields in which each field pertains to a particular user device capability. Additionally, or alternatively, for example, TAC database 174 may be implemented without user device capabilities field 210. In addition, other modifications to TAC database 174 may be implemented, not specifically described herein. For example, e-TAC identifier field 205 may point to or correlate with other attributes or parameters, indicated in other fields of TAC database 174 that are associated with network access (e.g., a user, a user device, etc.) and/or network usage.

E-TAC identifier field 205 stores an enhanced-TAC (e.g., e-TAC identifier) that indicates a make and a model of a user device. According to an exemplary implementation, the e-TAC identifier is based on the IMEI of the user device. For example, the e-TAC identifier may correspond to the first 8 digits of the IMEI, the first 9 digits of the IMEI, or the first 10 digits of the IMEI. According to another implementation, the e-TAC identifier corresponds to the IMEI. For example, the e-TAC identifier corresponds to the first 14 digits of the IMEI. As a further example, the e-TAC identifier may have a value between 25555555000000-25555555999999. According to such an implementation, a range of IMEIs (e.g., a starting IMEI value through an ending IMEI value) represents a make and a model of a user device. An IMEI of a user device, which is interpreted as the e-TAC identifier, that has a value within a particular range, will be attributed to the make and the model of the range. For example, assume that the range is 11111111111111-22222222222222 and user device 105 is associated with an e-TAC identifier that has a value of 12121211111111. Since the e-TAC identifier has a value within the range, user device 105 is attributed to the make and the model of the range 11111111111111-22222222222222. Additionally, in a degenerative case or an exceptional case, for example, in which the make and the model of user device 105 is rare, the e-TAC identifier may correspond to a single IMEI.

User device capabilities field 210 and user device class field 215 stores information that correlates with e-TAC identifier field 205. For example, user device capabilities field 210 stores information pertaining to a manufacturer of user device 105, the wireless band(s) that user device 105 operates, the size and/or resolution of a display associated with user device 105, the access technologies that user device 105 supports (e.g., LTE, etc.), operating system of user device 105, applications or programs of user device 105, etc. Additionally, for example, user device class field 215 stores information pertaining to a class of user device 105. For example, a class may indicate whether user device 105 is a smartphone, a machine-to-machine device, etc. User device 105 may belong to more than one user device class. Additionally, for example, a class of user device 105 may correlate with or indicate a type of service user device 105 may use in network 110.

Referring back to FIG. 1C, EIR database 170 also includes a black/white/grey database 176. Black/white/grey database 176 stores a black list, a white list, and a grey list. According to an exemplary implementation, user device 105 is mapped to a list based on the IMEI or a Mobile Equipment Identifier (MEID). According to an exemplary implementation, the black list includes information that indicates user devices 105 that should be blocked from accessing network 110. The white list includes information that indicates user devices 105 that should be allowed access to network 110. The grey list includes information that indicates user devices 105 that should be allowed access to network 110, but with security measures (e.g., send a notification or an alarm to a monitoring system).

IMEI policing database 178 includes a database that stores International Mobile Subscriber Identities (IMSIs). IMEI policing database 178 also stores information pertaining to the user device class and/or IMEIs.

Figure 2B:
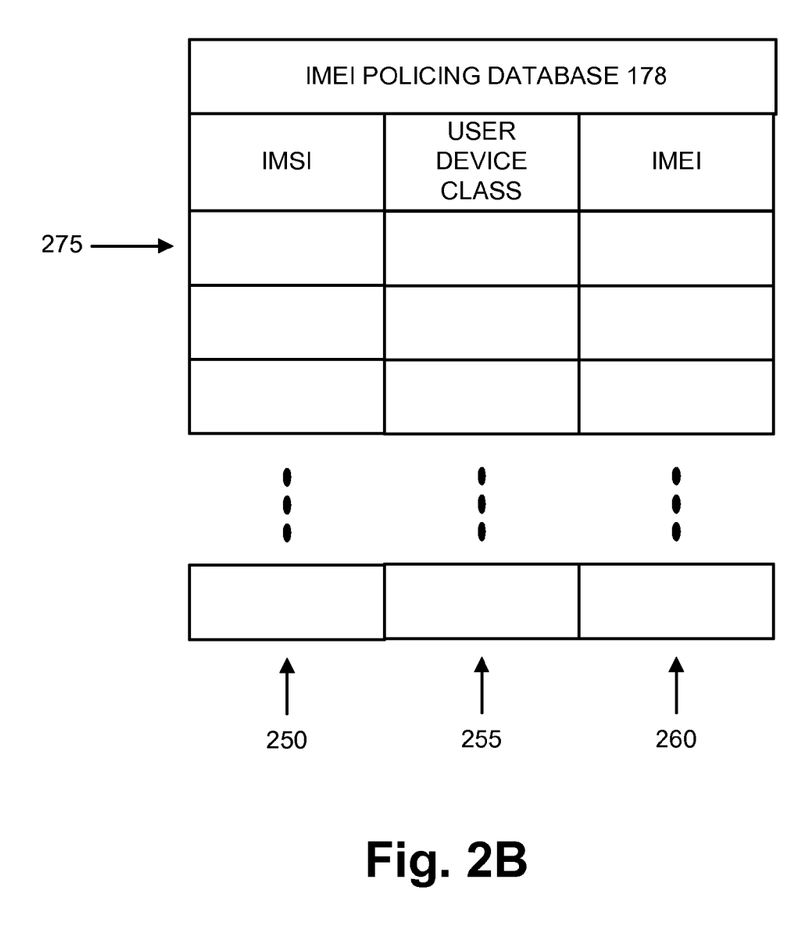
FIG. 2B is a diagram illustrating an exemplary policing database.

FIG. 2B is a diagram illustrating an exemplary implementation of IMEI policing database 178. As illustrated, IMEI policing database 178 includes an IMSI field 250, a user device class field 255, and an IMEI field 260. An entry 275 represents a row-wise correlation between IMSI field 250 and other fields of IMEI policing database 178. For example, an IMSI may be used as an index or a lookup key to IMEI policing database 178. According to other implementations, IMEI policing database 178 may include additional fields, fewer fields, and/or different fields. For example, IMSI field 250 may point to or correlate with other attributes or parameters, indicated in other fields of IMEI policing database 178, that are associated with network access (e.g., a user, a user device, etc.) and/or network usage. Additionally, or alternatively, IMEI policing database 178 may store IMSI field 250 and user device class field 255 or IMSI field 250 and IMEI field 260. For example, according to the implementation in which IMEI policing database 178 stores IMSI field 250 and user device class field 255, a correlation exists between user device class field 255 and user device class 215 of TAC database 174. Alternatively, according to another implementation, in which IMEI policing database 178 stores IMSI field 250 and IMEI field 260, a correlation exists between IMEI field 260 and e-TAC identifier 205 of TAC database 174.

IMSI field 250 stores an IMSI. User device class field 255 has been previously described. IMEI field 260 stores an IMEI. The IMEI may be 14, 15, or 16 digits.

User devices 105 may be granted or denied access to network 110 based on the information stored in EIR database 170, examples of which are discussed further below.

Figure 3:
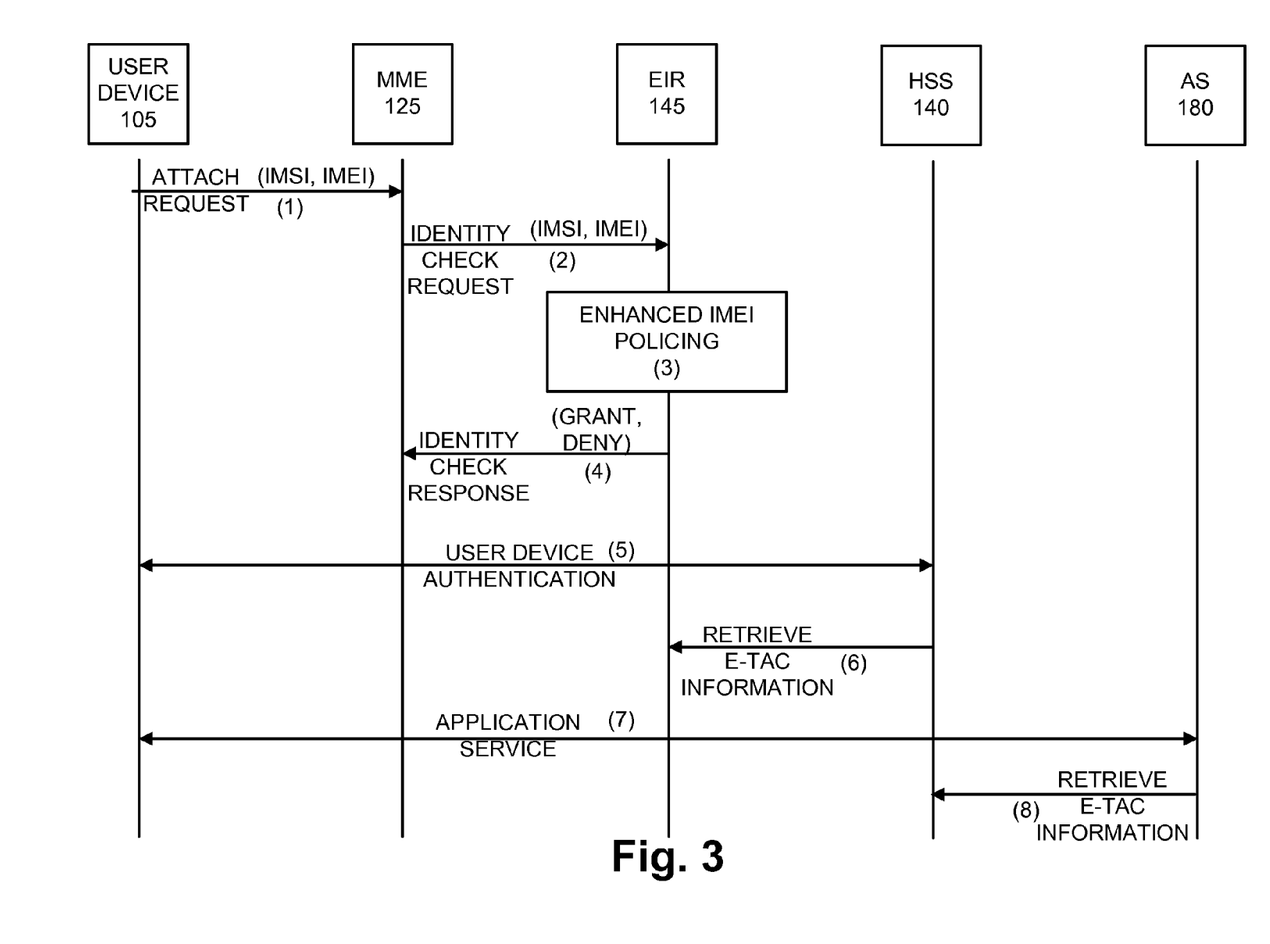
FIG. 3 is a messaging diagram illustrating an exemplary process pertaining to the granting and the denying of network access based on an enhanced-type code allocation identifier.

FIG. 3 is a messaging diagram pertaining to an exemplary process to regulate network access. The exemplary process is described in relation to the devices illustrated in the previous figures. The messages described and the data or information included therein are merely exemplary. According to other implementations, a device may use different types of messages and/or include different data or information. For example, depending on the communication standard supported by user device 105 and/or the communication standard supported by network 110, the type of messages and/or the data or information included in a message may be different. Additionally, or alternatively, although the exemplary process describes a particular device performing a step or an act of the process, the step or the act may alternatively be performed by another device or some combination of devices. Additionally, the transmission of a message may propagate via one or more intermediary network devices not illustrated in FIG. 3. For example, an attach request transmitted by user device 105 may propagate through a base station, etc.

Referring to FIG. 3, in step (1), user device 105 transmits an attach request to MME 125. The attach request includes an IMEI and an IMSI pertaining to user device 105 and a user of user device 105. In step (2), in response to the attach request, MME 125 transmits an identity request to EIR 145. The identity request includes the IMEI and the IMSI. EIR 145 transmits a query to EIR database 170 and determines whether user device 105 is allowed to access network 110. For example, referring back to FIG. 2B, the query includes a query as to whether the IMSI associated with a user and user device 105 (e.g., stored in a SIM card) is provisioned in IMSI field 250 of IMEI policing database 178. According to an exemplary implementation, if the IMSI associated with the user is not provisioned in IMEI policing database 178, EIR 145 will determine that user device 105 is granted access to network 110. According to an exemplary implementation, if the IMSI associated with the user is provisioned in IMEI policing database 178, but the IMEI does not match an IMEI included in IMEI field 260, which correlates with the IMSI, then EIR 145 will determine that user device 105 is not granted access to network 110. However, if the IMEI does match an IMEI included in IMEI field 260, then EIR 145 will determine that user device 105 is granted access to network 110.

Alternatively, according to another implementation, assume that IMEI policing database 178 does not include IMEI field 260. EIR 145 determines whether the user is granted access based on the e-TAC identifier. For example, referring to FIG. 2A, EIR 145 queries TAC database 174. For example, the query includes the e-TAC identifier, which is based on the IMEI associated with user device 105. If the e-TAC identifier is provisioned in TAC database 174, EIR 145 may obtain the correlated user device class of user device 105 in user device class field 215. EIR 145 may then determine whether the user device class correlates to the IMSI by querying IMSI field 250 and user device class field 255 of IMEI policing database 178, illustrated in FIG. 2B. If the e-TAC identifier is not provisioned, then EIR 145 will determine that user device 105 is not granted access to network 110. Alternatively, if the e-TAC identifier is provisioned but the correlated user device class does not correlate with the IMSI, then EIR 145 will determine that user device 105 is not granted access to network 110.

In step (4), EIR 145 transmits an identity check response to MME 125. The identity check response includes data or information indicating whether access is accepted or denied. According to this exemplary scenario, it may be assumed that access to network 110 is granted to user device 105.

In step (5), user device 105 and HSS 140 communicate to perform authentication. HSS 140 may receive, for example, the IMEI of user device 105. In step (6), HSS 140 may retrieve e-TAC information to store in central subscriber database 160. For example, this may occur if the central subscriber database 160 does not include the e-TAC information. HSS 140 may store information correlated with the e-TAC identifier (e.g., user device capability information and/or user device class information). It may be assumed that user device 105 is successfully authenticated by HSS 140.

As an aside, the granting or denying of access by EIR 145 may be considered a first phase authorization that prevents service access to network 110. This first phase of authorization may include using a device identifier, a device class, and a user identifier associated with a subscription. If user device 105 is granted access to network 110, HSS may perform, for example, a more comprehensive authentication and authorization process (e.g., similar to an HLR) in which the subscription may be authenticated and specific services are checked and authorized to obtain services. In this regard, according to some scenarios, it may be possible that user device 105 may be granted access to EIR 145 and the user is rejected by HSS 140 because there is no subscription provisioned in HSS 140, etc.

In step (7), user device 105 communicates to AS 180. In step (8), AS 180 communicates with HSS 140 to retrieve e-TAC information. AS 180 may use the e-TAC information to provide a quality of service to the user of user device 105. By way of example, AS 180 may tailor a service to user device 105 based on the user device class information and/or the user device capability information.

Figure 4:
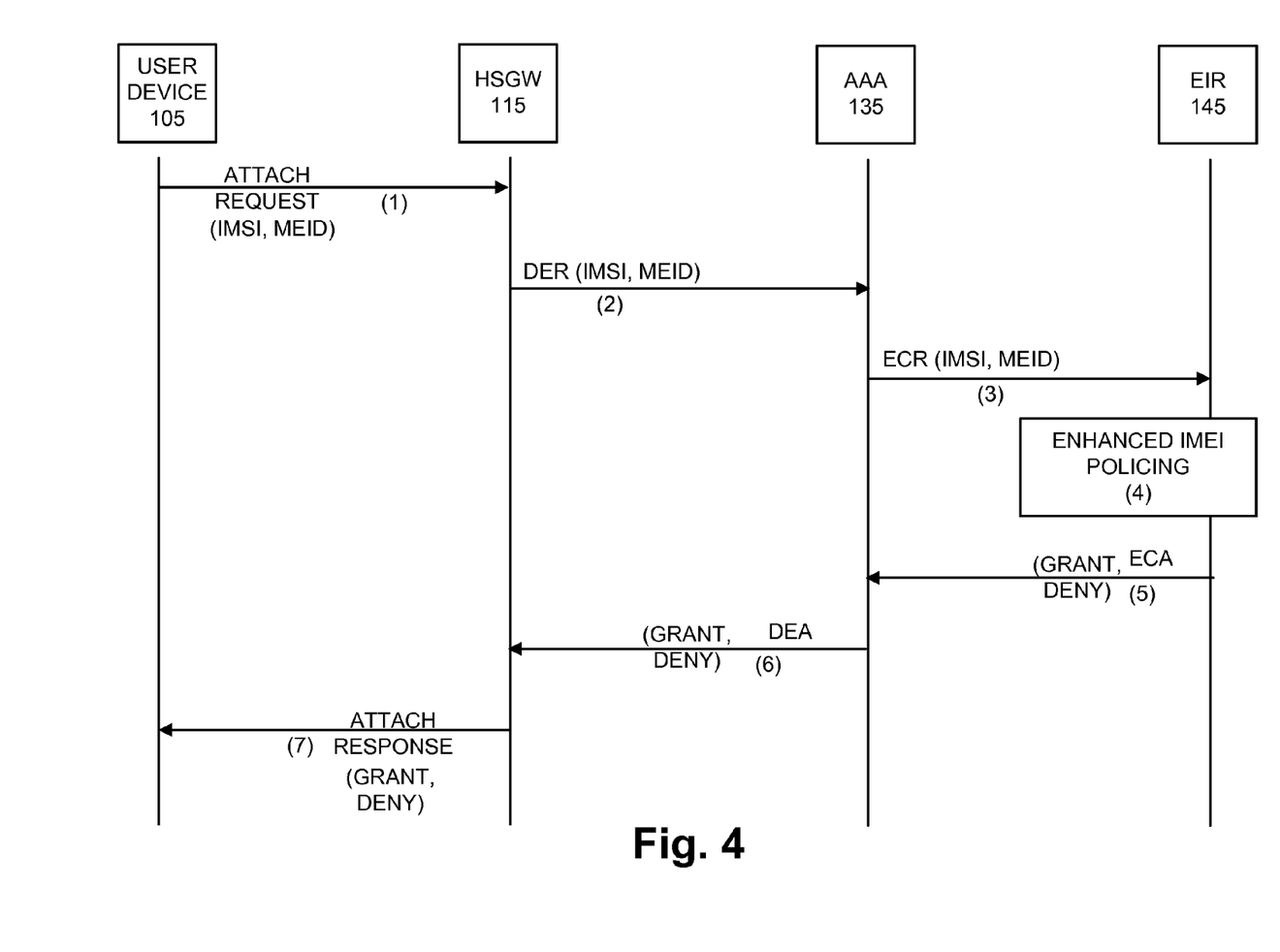
FIG. 4 is a messaging diagram illustrating another exemplary process pertaining to the granting and the denying of network access based on an enhanced-type code allocation identifier.

FIG. 4 is a messaging diagrams pertaining to an exemplary process to regulate network access. The exemplary process is described in relation to the devices illustrated in the previous figures. The messages described and the data or information included therein are merely exemplary. According to other implementations, a device may use different types of messages and/or include different data or information. Additionally, or alternatively, although the exemplary process describes a particular device performing a step or act of the process, the step or act may be alternatively performed by another device, or some combination of devices. Additionally, the transmission of a message may propagate via one or more intermediary network devices not illustrated in FIG. 4.

Referring to FIG. 4, in step (1), user device 105 user device 105 transmits an attach request to HSGW 115. The attach request includes an IMSI and a Mobile Equipment Identifier (MEID) pertaining to a user and user device 105. Typically, an MEID is implemented as a 14-digit hexadecimal value. However, according to an exemplary implementation, the MEID may be defined as decimal values to correspond to the format of an IMEI. According to such an implementation, the information stored in EIR database 170 may be used (e.g., provisioned IMEIs). In step (2), in response to the attach request, HSGW 115 transmits a Diameter Extensible Authentication Protocol (EAP) request (DER) to AAA 135. The DER includes the IMSI and the MEID. In step (3), AAA 135 transmits an Equipment Check Request (ECR) to EIR 145. The ECR includes the IMSI and the MEID. EIR 145 determines whether user device 105 is granted access to network 110 or not based on the IMSI and the MEID. For example, EIR 145 queries EIR database 170 in a manner similar to that previously described in FIG. 3. In this case, the MEID operates in the same manner as the IMEI. Additionally, an e-TAC identifier may be identified based on the MEID.

In step (5), EIR 145 transmits an Equipment Check Answer (ECA) to AAA 135. The ECA includes data or information indicating whether user device 105 is granted access to network 110. In step (6), AAA 135 transmits Diameter EAP Answer (DEA) to HSGW 115. The DEA indicates whether network access is granted or denied. In response, HSGW 115 transmits an attach response to user device 105 that indicates whether network access is granted or denied.

Figure 5:
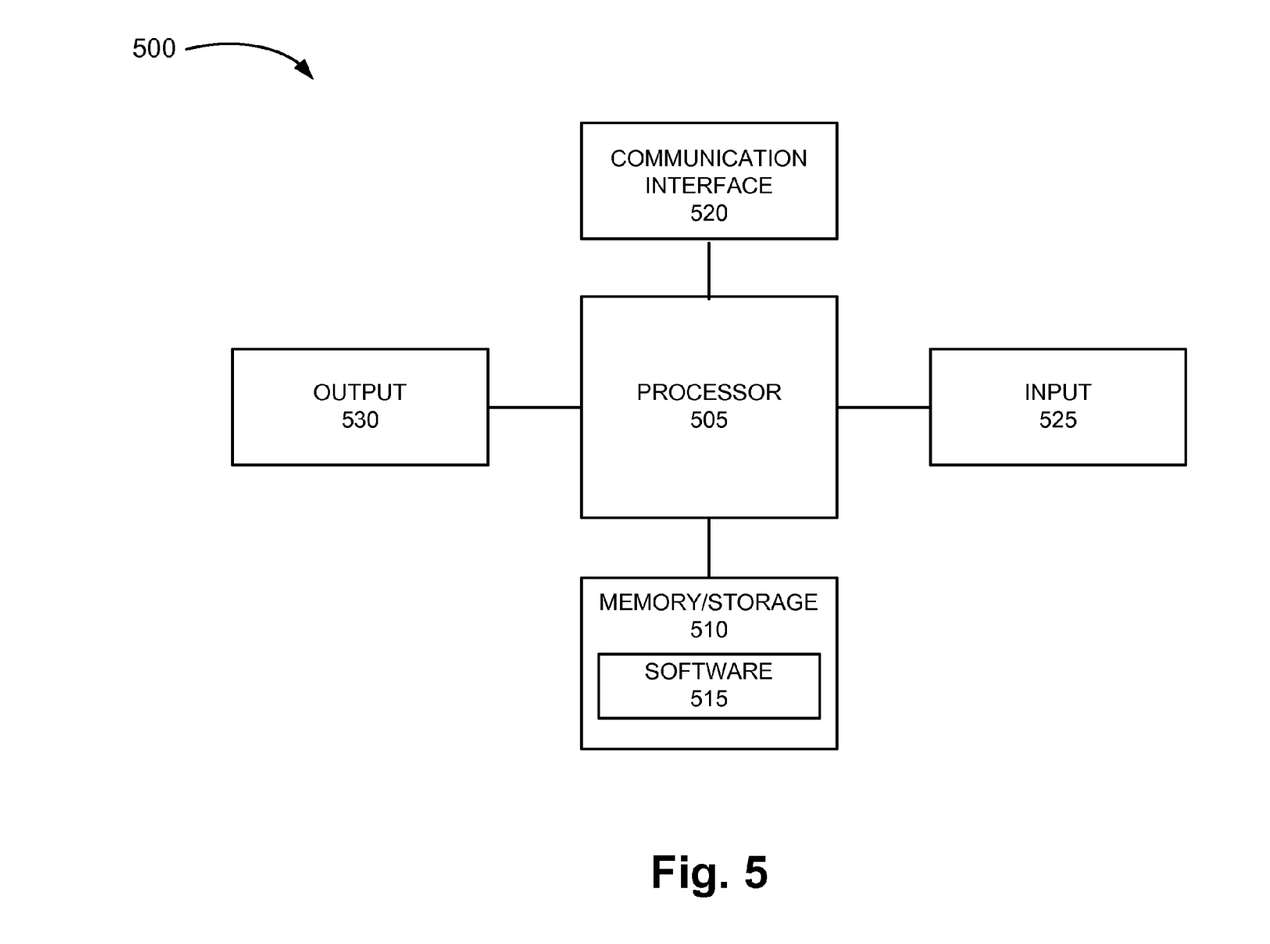
FIG. 5 is a diagram illustrating exemplary components of a device that may correspond to one or more of the devices previously depicted.

FIG. 5 is a diagram illustrating exemplary components of a device 500 that may correspond to one or more of the devices depicted in the previous figures. As illustrated, according to an exemplary embodiment, device 500 may include a processor 505, memory/storage 510, software 515, a communication interface 520, an input 525, and an output 530. According to other embodiments, device 500 may include fewer components, additional components, different components, and/or a different arrangement of components than those illustrated in FIG. 5 and described herein.

Processor 505 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 505 may be implemented as hardware (e.g., a microprocessor, etc.), a combination of hardware and software (e.g., a SoC, an ASIC, etc.), may include one or multiple memories (e.g., memory/storage 510), etc.

Processor 505 may control the overall operation or a portion of operation(s) performed by device 500. Processor 505 may perform one or multiple operations based on an operating system and/or various applications or programs (e.g., software 515). Processor 505 may access instructions from memory/storage 510, from other components of device 500, and/or from a source external to device 500 (e.g., a network, another device, etc.).

Memory/storage 510 may include one or multiple memories and/or one or multiple other types of storage mediums. For example, memory/storage 510 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 510 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 510 may include drives for reading from and writing to the storage medium.

Memory/storage 510 may be external to and/or removable from device 500, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 510 may store data, software, and/or instructions related to the operation of device 500.

Software 515 may include an application or a program that provides a function and/or a process. Software 515 may include firmware.

Communication interface 520 may permit device 500 to communicate with other devices, networks, systems, etc. Communication interface 520 may include one or multiple wireless interfaces and/or wired interfaces. Communication interface 520 may include one or multiple transmitters, receivers, and/or transceivers. Communication interface 520 may operate according to one or multiple protocols, standards, and/or the like.

Input 525 may permit an input into device 500. For example, input 525 may include a keyboard, a mouse, a display, a touchscreen, a touchless screen, a button, a switch, an input port, speech recognition logic, and/or some other type of visual, auditory, tactile, etc., input component. Output 530 may permit an output from device 500. For example, output 530 may include a speaker, a display, a touchscreen, a touchless screen, a light, an output port, and/or some other type of visual, auditory, tactile, etc., output component.

Device 500 may perform processes and/or functions, as described herein, in response to processor 505 executing software 515 stored by memory/storage 510. By way of example, instructions may be read into memory/storage 510 from another memory/storage 510 or from another device via communication interface 520. The instructions stored by memory/storage 510 may cause processor 505 to perform one or more processes described herein. Alternatively, for example, according to other implementations, device 500 may perform one or more processes described herein based on the execution of hardware (processor 505, etc.), the execution of firmware with hardware, or the execution of software and firmware with hardware.

Figure 6A:
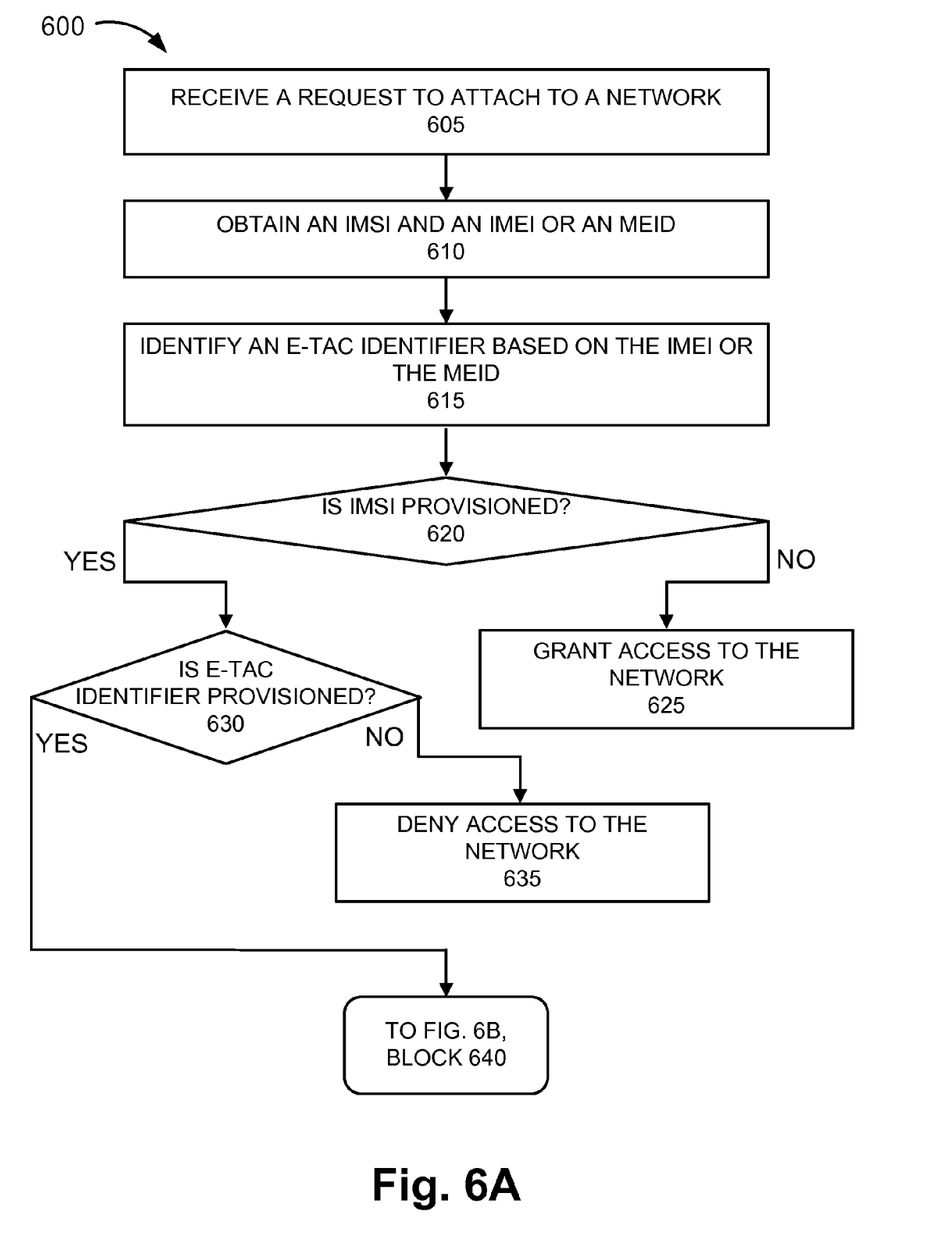
FIGS. 6A and 6B are flow diagrams illustrating an exemplary process pertaining to an exemplary embodiment of network access policing based on an enhanced type allocation identifier.
Figure 6B:
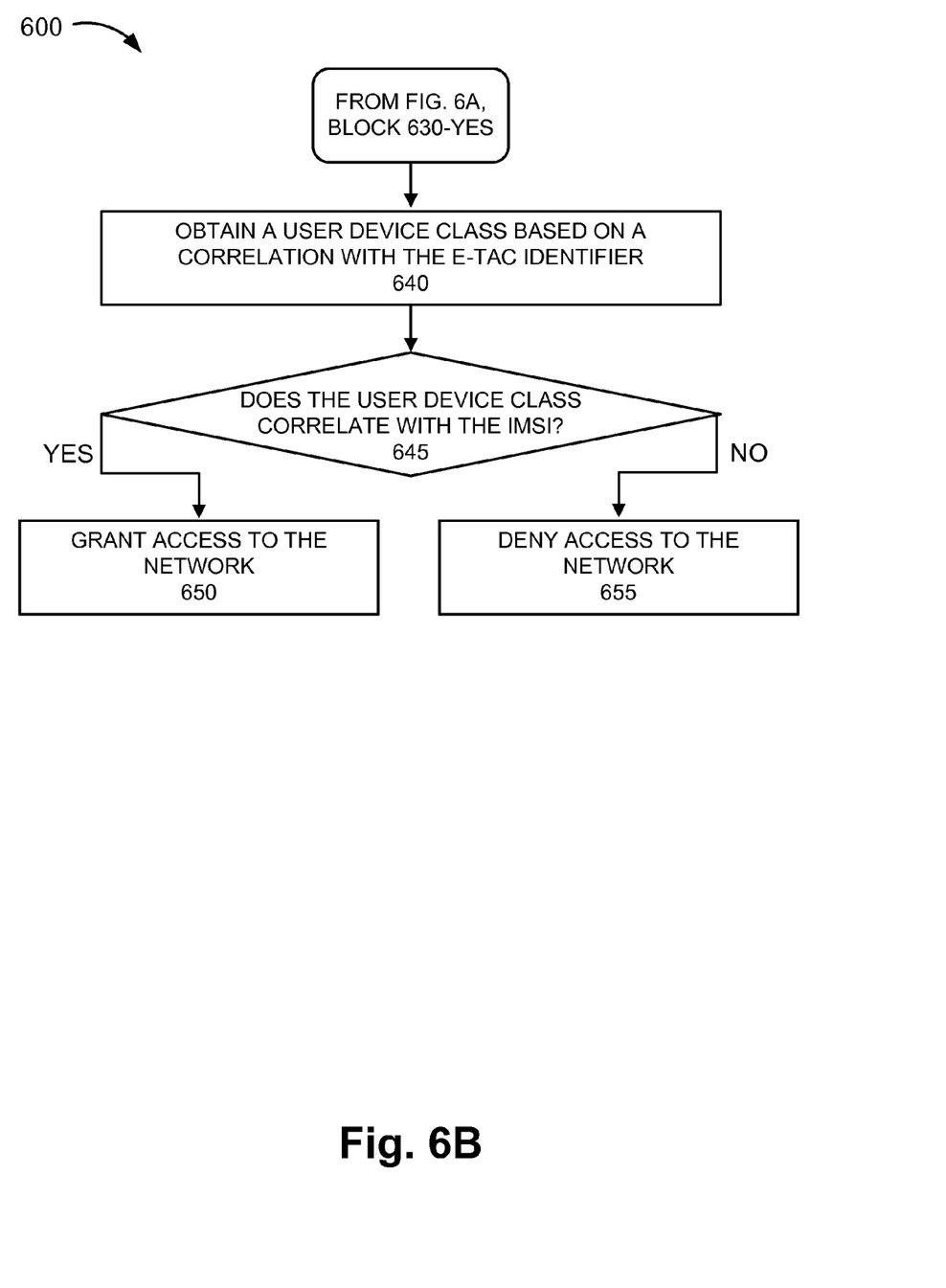

FIGS. 6A and 6B are flow diagrams illustrating an exemplary process 600 pertaining to an exemplary embodiment of a network having an enhanced equipment identity registration system, as described herein. According to an exemplary embodiment, a network device (a network element) performs one or more of the steps described in process 600. For example, processor 505 may execute software 515 to perform the steps described.

Referring to FIG. 6A, block 605, a request to attach to a network is received. For example, user device 105 transmits a request to attach to network 110. The request is received by a network device of network 110. For example, the network device may be implemented as MME 125 or HSGW 115.

In block 610, a user identifier and a device identifier are obtained. For example, the request to attach includes an IMSI and an IMEI or an MEID.

In block 615, an e-TAC identifier is identified based on the IMEI or the MEID. For example, the network device transmits the IMSI and the IMEI or the MEID to EIR 145. EIR 145 identifies the e-TAC identifier based on the IMEI or the MEID. By way of example, depending on the implementation, the e-TAC identifier may correspond to the first 8-10 digits of the IMEI or the MEID, or the first 14 digits of the IMEI or the MEID, or all digits of the IMEI or the MEID.

In block 620, it is determined whether the IMSI is provisioned. For example, EIR 145 queries EIR database 170 to determine whether the IMSI received is provisioned in IMEI policing database 178. If it is determined that the IMSI is not provisioned (block 620—NO), then network access is granted (block 625). For example, an attach response is transmitted to user device 105 indicating that network access is granted. According to other implementations, network 110 may decide to deny access or take other actions based on network access policies or rules that are provisioned.

If it is determined that the IMSI is provisioned (block 620—YES), then it is determined whether an e-TAC identifier is provisioned (block 630). For example, EIR 145 transmits a query to EIR database 170 to determine whether the e-TAC identifier is provisioned. For example, TAC database 174 stores e-TAC identifiers.

If it is determined that the e-TAC identifier is not provisioned (block 630—NO), then network access is denied (block 635). For example, EIR 145 determines to deny access to user device 105. For example, an attach response is transmitted to user device 105 indicating that network access is denied.

If it is determined that the e-TAC identifier is provisioned (block 630—YES), then (referring to FIG. 6B) a user device class is obtained based on a correlation with the e-TAC identifier (block 640). For example, EIR 145 obtains the user device class that correlates with the e-TAC identifier based on a response to a query directed to TAC database 174.

In block 645, it is determined whether the user device class correlates with the IMSI. For example, EIR 145 determines whether the user device class correlates with the IMSI based on the response to a query.

If it is determined that the user device class correlates with the IMSI (block 645—YES), then network access is granted (block 650). For example, an attach response is transmitted to user device 105 indicating that network access is granted.

If it is determined that the user device class does not correlate with the IMSI (block 645—NO), then network access is denied (block 655). For example, an attach response is transmitted to user device 105 indicating that network access is denied.

Although FIGS. 6A and 6B illustrate an exemplary process 600 pertaining to the interactive program system, process 600 may include additional operations, fewer operations, and/or different operations than those illustrated in FIGS. 6A and 6B and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6A and 6B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 505, etc.), a combination of hardware and software (e.g., software 515), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   storing user identifiers, enhanced type allocation code identifiers, user device capability information, and user device class information that indicates classes of user devices, wherein a range of enhanced type allocation code identifiers indicates a make and a model of user device, and the enhanced type allocation code identifiers are greater than eight digits and less than fourteen digits of device identifiers;
   receiving a request to attach to a network from a user device;
   obtaining a user identifier and a device identifier;
   identifying an enhanced type allocation code identifier from the device identifier, wherein the enhanced type allocation code identifier is a portion of the device identifier greater than eight digits and less than fourteen digits of the device identifier and indicates a make and a model of the user device, and wherein the user identifier, the device identifier, and the enhanced type allocation code identifier each comprises a different type of identifier;
   determining if network access is granted or denied based on whether a correlation exists between the user identifier, a user device class of the user device, and the enhanced type allocation code identifier by comparing the user identifier, the user device class, and the enhanced type allocation code identifier with the user identifiers, the enhanced type allocation code identifiers, and the user device class information, wherein the determining comprises:
      comparing the user identifier to the user identifiers to determine if a match exists based on a determination that a match exists between the enhanced type allocation code identifier and the enhanced type allocation code identifiers; and wherein the user device class information indicates a type of service to be used, by the classes of user devices, subsequent to a granting;
   granting network access in response to a determination that the correlation exists between the user identifier, the user device class, and the enhanced type allocation code identifier; and
   providing the type of service, subsequent to the granting, based on the user device class information associated with the user device.

2. The method of claim 1,
   wherein the providing comprises:
   authenticating and authorizing a subscription to the type of service.

3. The method of claim 2, wherein the user device class information includes a smartphone class and a machine-to-machine device class.

4. The method of claim 2, wherein the user device capability information includes a manufacturer of a user device, a wireless band in which a user device operates, a size and resolution of a display associated with a user device, and an access technology that a user device supports.

5. The method of claim 1, further comprising:
   denying network access in response to a determination that the correlation does not exist between the user identifier, the user device class, and the enhanced type allocation code identifier.

6. The method of claim 1, wherein the device identifier corresponds to an International Mobile Equipment Identifier, and wherein the enhanced type allocation code identifier corresponds to a portion of the International Mobile Equipment Identifier.

7. The method of claim 1, wherein the device identifier corresponds to a Mobile Equipment Identifier, and wherein the enhanced type allocation code identifier corresponds to a portion of the Mobile Equipment Identifier.

8. The method of claim 1, wherein the user identifier corresponds to an International Mobile Subscriber Identity, and the method further comprising:
   determining whether the International Mobile Subscriber Identity is stored in a database; and
   determining whether the enhanced type allocation code identifier correlates to the International Mobile Subscriber Identity in response to a determination that the International Mobile Subscriber Identity is stored in the database.

9. A network device comprising:
   a communication interface;
   one or more memories that store instructions; and
   one or more processors to execute the instructions to:
      receive, via the communication interface, a request for permission to attach a user device to a network, wherein the request includes a user identifier and a device identifier of the user device;
      identify an enhanced type allocation code identifier from the device identifier, wherein the enhanced type allocation code identifier is a portion of the device identifier greater than eight digits and less than fourteen digits of the device identifier and indicates a make and a model of the user device, and wherein the user identifier, the device identifier, and the enhanced type allocation code identifier each comprises a different type of identifier;
      query, based on the enhanced type allocation code identifier, a first database that stores enhanced type allocation code identifiers and user device class information, wherein the user device class information indicates classes of user devices, and wherein a range of enhanced type allocation code identifiers indicates a make and a model of user device, and the enhanced type allocation code identifiers are greater than eight digits and less than fourteen digits of device identifiers;
      determine if network access is granted or denied based on whether a correlation exists between the user identifier, a user device class of the user device, and the enhanced type allocation code identifier based on a comparison of enhanced type allocation code identifiers and the user device class information with the user device class and the enhanced type allocation code identifier, wherein to determine comprises:
         compare the user identifier to the user identifiers to determine if a match exists based on a determination that a match exists between the enhanced type allocation code identifier and the enhanced type allocation code identifiers; and wherein the user device class information indicates a type of service to be used, by the classes of user devices, subsequent to a granting of network access;

transmit, via the communication interface, a response indicating the granting of network access in response to a determination that the correlation exists between the user identifier, the user device class, and the enhanced type allocation code identifier; and provide the type of service, subsequent to the granting, based on the user device class information associated with the user device.

10. The network device of claim 9, wherein the one or more processors further execute the instructions to:

transmit, via the communication interface, a response indicating a denying of network access in response to a determination that the correlation does not exist between the user identifier, the user device class, and the enhanced type allocation code identifier.

11. The network device of claim 10, wherein the first database stores user device capability information that correlates with the enhanced type allocation code identifiers.

12. The network device of claim 9, wherein the device identifier corresponds to an International Mobile Subscriber Identity, and wherein the one or more processors further execute the instructions to:

query a second database that stores International Mobile Subscriber Identities that correlate with the user device class information.

13. The network device of claim 9, wherein the device identifier corresponds to an International Mobile Subscriber Identity, and wherein the one or more processors further execute the instructions to:

query a second database that stores International Mobile Subscriber Identities that correlate with device identifiers; and determine whether the enhanced type allocation code identifier correlates with the International Mobile Subscriber Identity.

14. The network device of claim 9, wherein the network device comprises an equipment identity registration device.

15. The network device of claim 9, wherein the user device class information includes a smartphone class and a machine-to-machine device class.

16. The network device of claim 9, wherein the device identifier corresponds to a Mobile Equipment Identifier.

17. A non-transitory storage medium storing instructions executable by a processor of a computational device, which when executed, cause the computational device to:

receive a request for permission to attach a user device to a network, wherein the request includes a user identifier and a device identifier of the user device;

identify an enhanced type allocation code identifier from the device identifier, wherein the enhanced type allocation code identifier is a portion of the device identifier greater than eight digits and less than fourteen digits of the device identifier and indicates a make and a model of the user device, and wherein the user identifier, the device identifier, and the enhanced type allocation code identifier each comprises a different type of identifier;

query, based on the enhanced type allocation code identifier, a first database that stores enhanced type allocation code identifiers and user device class information, wherein the user device class information indicates classes of user devices, and wherein a range of enhanced type allocation code identifiers indicates a make and a model of user device, and the enhanced type allocation code identifiers are greater than eight digits and less than fourteen digits of device identifiers;

determine if network access is granted or denied based on whether a correlation exists between the user identifier, a user device class of the user device, and the enhanced type allocation code identifier based on a comparison of enhanced type allocation code identifiers and the user device class information with the user device class and the enhanced type allocation code identifier, wherein to determine comprises:

compare the user identifier to the user identifiers to determine if a match exists based on a determination that a match exists between the enhanced type allocation code identifier and the enhanced type allocation code identifiers; and wherein the user device class information indicates a type of service to be used, by the classes of user devices, subsequent to a granting;

transmit a response indicating a granting of network access in response to a determination that the correlation exists between the user identifier, the user device class, and the enhanced type allocation code identifier; and provide the type of service, subsequent to the granting, based on the user device class information associated with the user device.

18. The non-transitory storage medium of claim 17, wherein the instructions comprise further instructions executable by the processor of the computational device, which when executed, cause the computational device to:

transmit a response indicating a denying of network access in response to a determination that the correlation does not exist between the user identifier, the user device class, and the enhanced type allocation code identifier.

19. The non-transitory storage medium of claim 17, wherein the user identifier corresponds to an International Mobile Subscriber Identifier, and wherein the instructions comprise further instructions executable by the processor of the computational device, which when executed, cause the computational device to:

query a second database that stores International Mobile Subscriber Identifiers that correlate to one of device identifiers or the user device class information.

20. The non-transitory storage medium of claim 19, wherein the instructions comprise further instructions executable by the processor of the computational device, which when executed, cause the computational device to:

determine whether the user identifier matches one of the International Mobile Subscriber Identifiers stored in the second database; and wherein the instructions to query the first database comprise further instructions executable by the processor of the computational device, which when executed, cause the computational device to:

query the first database to determine if the enhanced type allocation code identifier matches one of the enhanced type allocation code identifiers based on a determination that the International Mobile Subscriber Identifier matches the one of the International Mobile Subscriber Identifiers.

* * * * *